H. G. WEATHERILL.
TRACE HOLDER.
APPLICATION FILED MAY 13, 1908.
955,026.
Patented Apr. 12, 1910.
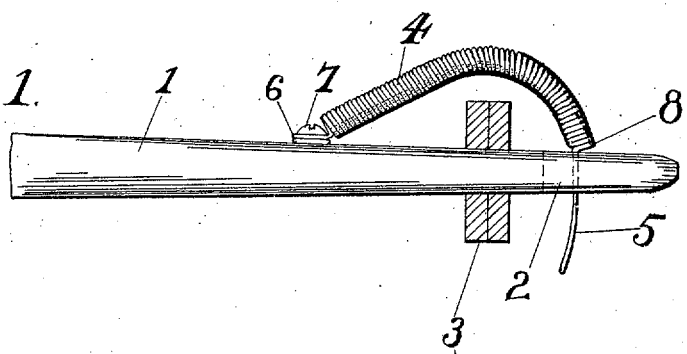
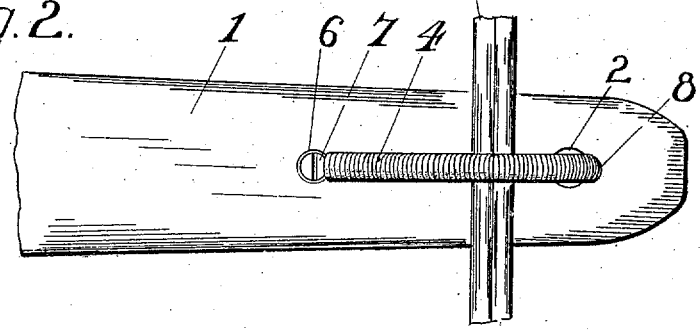
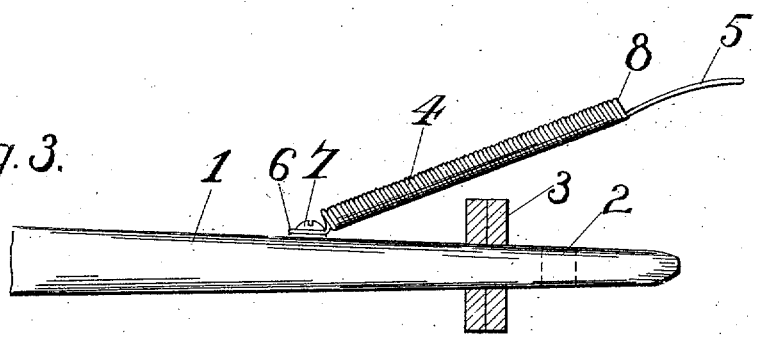
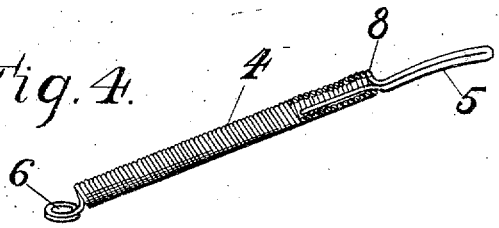
Witnesses
H. H. Cummings
W. Keane Small
Inventor
Henry G. Weatherill,
By Elson Bros,
Attorneys

UNITED STATES PATENT OFFICE.

HENRY G. WEATHERILL, OF ELGIN, ILLINOIS.

TRACE-HOLDER.

955,026.  Specification of Letters Patent. Patented Apr. 12, 1910.

Application filed May 13, 1908. Serial No. 432,690.

*To all whom it may concern:*

Be it known that I, HENRY G. WEATHERILL, a citizen of the United States, residing at Elgin, in the county of Kane and State of Illinois, have invented certain new and useful Improvements in Trace-Holders; and I do hereby declare the following to be a full, clear, and exact description of the invention, such as will enable others skilled in the art to which it appertains to make and use the same.

My invention relates to whiffletrees and especially to devices for retaining the traces on the ends thereof.

It has for its object to provide a device of this nature which is very simple in construction, cheap of manufacture, and easy to manipulate.

The invention consists in the features of construction and combinations of parts hereinafter described and specified in the claim.

In the accompanying drawings illustrating the preferred embodiment of my invention: Figure 1 is a side view of one end of a whiffletree showing a trace engaged therewith and retained in position by my holder. Fig. 2 is a plan view thereof. Fig. 3 is a side view showing a position of the holder when its free end is not engaged with the perforation in the whiffletree, and Fig. 4 is a detail view of the trace holder partly in section.

Referring particularly to the drawings, 1 designates the whiffletree provided with a perforation 2 near its end and 3 is the trace which is slipped over the end of the whiffletree in the usual manner.

The trace holder is preferably made of a single piece of resilient wire and comprises a coiled or helical shank portion 4 and an approximately straight end portion 5 extending in the same line with said shank. The other end is formed into an eye 6 which is bent at an oblique angle to the longitudinal axis of the shank and is secured to the whiffletree by means of a screw or rivet 7. Because the eye 6 is bent out of line with the shank of the holder, said shank assumes a position oblique to the whiffletree when its free end is not engaged with the perforation therein. The trace holder is, therefore, out of the way of the trace when it is slipped over the end of the whiffletree and it is not necessary to raise and hold said trace holder while the trace is being adjusted which is very inconvenient but must be done where the shank lies flat upon the whiffletree, as is the case with some devices of this character which have been patented and are now in use. When the free end portion 5 is inserted through the perforation in the whiffletree the shank portion is bowed and forms an arch or bridge over the trace and effectively prevents the latter from slipping off or being accidentally disengaged. It will be noted that in order to insert the end portion of the holder into the perforation in the whiffletree it is necessary to bend or bow the shank portion against the action or resiliency of the spring of which it is made so that said end portion when engaged with said perforation is pressed forcibly against the wall thereof preventing it from being inadvertently disengaged from said perforation. It will also be noted that the extremity 8 of the coiled or helical shank from which the end portion 5 projects constitutes a stop which engages the face of the whiffletree after said end portion has been inserted through the perforation and holds said shank in the proper arched position.

The end portion 5 of the trace holder is preferably reinforced by doubling the wire upon itself as shown particularly in Fig. 4, the extremity of the wire being inserted into the coiled shank.

I am aware that changes may be made in the construction shown and described herein without departing from the spirit or sacrificing the advantages of my invention. I, therefore, do not limit myself to this exact construction and arrangement of parts.

I claim:

The combination with a whiffletree having a perforation therein, of a trace holder consisting of a single piece of resilient wire having a helical shank, an eye forming an obtuse angle with said shank whereby the latter, when not in use, diverges from the whiffletree and normally extends outwardly therefrom beyond said perforation and out of the path of the trace in applying it to the whiffletree, and an extension adapted to engage the perforation in said whiffletree when said shank is bowed against its resiliency.

In testimony whereof, I affix my signature, in presence of two witnesses.

HENRY G. WEATHERILL.

Witnesses:
W. C. WILLSON,
GEO. DEMLOW.